United States Patent [19]

Miyazato

[11] 4,109,695
[45] Aug. 29, 1978

[54] PUNCTURE-PROOF TUBELESS TIRES

[76] Inventor: Teruhiko Miyazato, 18-7, Shiomi-cho, Sasebo-shi, Nagasaki-ken, Japan

[21] Appl. No.: 737,767

[22] Filed: Nov. 1, 1976

[30] Foreign Application Priority Data

Nov. 14, 1975 [JP] Japan .................. 50/136156

[51] Int. Cl.² .............................................. B60C 21/08
[52] U.S. Cl. ................................... 152/347; 106/33; 152/330 L; 156/115
[58] Field of Search ......... 152/346, 347, 348, 330 RF, 152/330 L; 156/115; 106/33; 260/4 R

[56] References Cited

U.S. PATENT DOCUMENTS

| 3,857,427 | 12/1974 | Soucek | 152/347 |
| 3,881,537 | 5/1975 | Miyazato | 152/347 |

*Primary Examiner*—Drayton E. Hoffman
*Assistant Examiner*—Donald W. Underwood
*Attorney, Agent, or Firm*—Burgess, Dinklage & Sprung

[57] ABSTRACT

A puncture-proof tubeless tire having an additional reinforcing rubber layer provided on the inside of a cord layer of the tire at a region corresponding at least to a crown and shoulders of the tire. The thickness of the reinforcing rubber layer at a region corresponding to the crown and shoulders is advantageously within the range of a 0.4 to 4 times that of an outer rubber layer of the region corresponding to the crown and shoulders excluding the thickness of patterned projections. A lining agent comprising a mixture of an adhesive and diethylene glycol and rubber particles dispersed therein may advantageously be employed in the tire as mentioned above not only to further ensure the puncture-proof character of the tire but also to suppress an excessive temperature rise of the tire, avoiding deterioration of the tire by heat.

7 Claims, 3 Drawing Figures

PUNCTURE-PROOF TUBELESS TIRES

This invention relates to a puncture-proof tire, and more particularly to a tire having a novel inner structure which is capable of preventing a puncture, attaining sufficient resistance to a puncture.

Cars run or stop only through their tires and accordingly, safe running of the cars greatly relies on safety of the tires. In fact, it is reported that the majority of tire troubles are due to accidental punctures and that most of such punctures are caused by nails struck into the crown and/or shoulders of the tires while running. On the other hand, tires are being made thinner to reduce cost and weight. These tires, however, limited resistance to puncture for example by nails. Stated illustratively, when nails are picked up and stuck into the tires, the nails are likely to reach the cord layers or possibly project through the cord layers especially when the tires are worn. This is also often the case with spikes of spike tires. In the spike tires, spikes are put in the tires at the treads for prevention of slip on snowy ground and the spikes easily break the cord layers and make holes when the spikes are relatively long as compared with the thickness of the tires or when the tires are worn. To overcome this drawback, some proposals, for example, provision of a steel belt as a breaker have been made. However, these proposals are not sufficient to completely prevent or resist punctures.

The inventor of the present invention has developed his idea that a tire having a rubber layer of sufficient thickness would well prevent puncture of the tire and found that when an additional reinforcing rubber layer was provided inside a cord layer of the tire, it could effectively clothe nails or spikes when they projected through the cord layer, preventing a puncture, due to elasticity or resiliency of the reinforcing rubber layer. He also found that the reinforcing rubber layer provided at a position corresponding to crown and shoulder portions of the tire in a thickness of 0.4 to 4 times of that of the corresponding outer rubber layer of the tire excluding the thickness of patterned projections, provided sufficient puncture prevention. It was also found that the reinforcing rubber layer further contributed to reinforce the cord layer thereby to advantageously prevent possible cracking or bursting of the tire.

On the other hand, it has been known from U.S. Pat. Nos. 3,860,539 and 3,881,537 issued to the same inventor and applicant as of the present application that, if a lining agent comprising an aqueous dispersion of an adhesive with rubber particles dispersed therein is contained in the interior of the tire, when the tire is punctured, the lining agent can automatically seal the hole.

According to a further study of the inventor of the present invention, it has been found that a specific lining agent prepared by mixing an adhesive with a considerable amount of diethylene glycol and dispersing rubber particles in the mixture is advantageously applicable to a tire of the present invention. Illustratively stated, the improved lining agent could keep its self-sealing effect at a temperature as low as −45° C. and also have an effect to suppress a temperature rise of the tire while running. Thus, it has turned out that this specific lining agent, when employed for the tire having the reinforcing rubber layer which tends to prevent escape of the heat generated in the tire, could further ensure the resistance of the tire to punctures at a low temperature and also prevent deterioration of the tire due to the heat which would be generated in long hot running, by effectively suppressing an excessive temperature rise of the tire.

One object of the present invention is to provide a puncture-proof tubeless tire adapted to seal holes when nails or spikes project through a cord layer of the tire by clothing the nails or spikes.

Another object of the present invention is to provide a puncture-proof tubeless tire which is capable of preventing possible cracking or bursting of the tire especially when the tire has been relatively worn.

A further object of the present invention is to provide a puncture-proof tubeless tire which is capable of automatically sealing holes with a specific lining agent contained in the interior of the tire.

A still further object of the present invention is to provide a puncture-proof tubeless tire which is capable of suppressing heat generation of the tire in running so as to prevent deterioration of the tire due to the heat.

According to the present invention, there is provided a puncture-proof tubeless tire which comprises: (a) an outer first rubber layer consisting of a crown having a thread with patterned portions, shoulders, side walls and bead portions; (b) a cord layer provided on the inner surface of the outer first rubber layer; and (c) a reinforcing second rubber layer provided on the inside of the cord layer at its region corresponding at least to the crown and the shoulders.

These and other objects and features of this invention will be better understood upon consideration of the following detailed description and the accompanying drawings in which.

Figure 1:
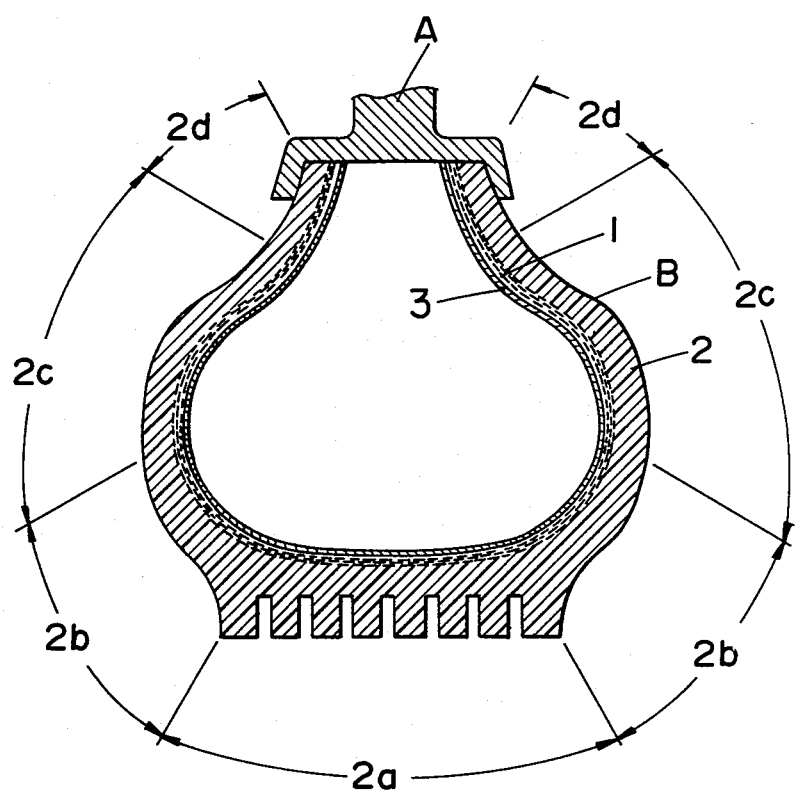
FIG. 1 is a cross-section of a conventional tubeless tire.

Referring now to FIG. 1, there is shown a structure of a conventional tubeless tire. Character A designates a wheel and B a tire which consists of a rubber layer 2, a cord layer 1 covered with the rubber layer 2 and a liner 3 of rubber materials provided inside the cord layer 1.

The rubber layer 2 has, as depicted in FIG. 1, a crown 2a having a treat to contact the ground, shoulders 2b adjacent the crown, side walls 2c and bead portions 2d at the inner peripheral portions of the tire.

Figure 2:
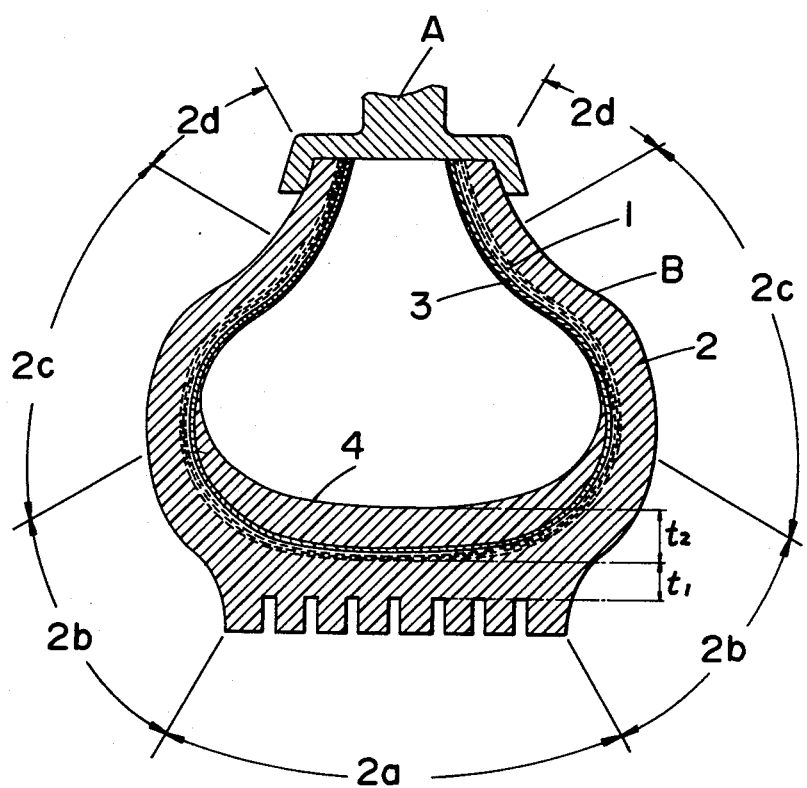
FIG. 2 is a cross-section of one form of a puncture-proof tubeless tire according to the present invention.

FIG. 2 shows one embodiment of a tire according to the present invention and has, like the conventional tire of FIG. 1, an outer first rubber layer 2 including a crown 2a, shoulders 2b, side walls 2c and bead portions 2d, a cord layer 1 covered with the first rubber layer 2 and a liner 3 of the cord layer 1. This tire further has a reinforcing second rubber layer 4 on the inner surface of the liner 3 which is in turn provided inside the cord layer 1 as mentioned above. The second rubber layer 4 is provided at least at a position corresponding to the crown 2a and the shoulders 2b of the tire and has a thickness $t_2$ in section of 0.4 to 4 times the thickness $t_1$ of the corresponding crown and shoulders of the first rubber layer 2 excluding the thickness of the patterned projections (in FIG. 2 the thickness is designated only with respect to the crown and the portion corresponding thereto.). The thickness of the reinforcing second rubber layer 4 at a region corresponding to the crown and shoulders may be selected in the range as mentioned above according to the kind of cars to which the tire is applied. Stated illustratively, the range of 0.4 to 2, preferably 0.6 to 1.4 may advantageously be selected for high-speed cars such as ordinary automobiles; the range of 0.4 to 3, preferably 1 to 2.4 may advantageously be selected for middle-speed cars such as autotrucks etc.; and the range of 0.4 to 4, preferably 1.4 to 3 may advantageously be selected for low-speed cars such as fork lift trucks, cranes, etc.

Thus, according to the present invention, the tire gains extra weight by providing the additional rubber layer 4, which serves to lower the gravity center of the car to enhance ground-hugging of the tire. Accordingly, provision of the second rubber layer enables the car to drive surely and safely without making a slip even under such bad road conditions as muddy or snowy road conditions. It is therefore understandable that the tire structure of the present invention is applicable with great advantage especially for snow-tires or tires of such work-cars as fork lift trucks etc. On the other hand, due to the provision of the extra rubber layer 4, there is a higher moment of inertia than the ordinary tire so that the tire can rotate more easily and the fuel consumption may be reduced. Further, a shock or noise caused in running across junctions of pavements or running on rough roads can be effectively absorbed by this specifically thickened rubber layer.

In the embodiment of FIG. 2 the second rubber layer 4 is so provided as to cover all the inner surface of the liner 3 but the second rubber layer 4 is not critically required at positions corresponding to the side walls 2c and the bead portions 2d. The second rubber layer 4 is advantageously so formed as to reduce its thickness at positions corresponding to the shoulders 2b as depicted in FIG. 2. It is further preferable that the second rubber layer 4 forms a smooth inner surface without angulating at positions across the shoulders 2b and the side walls 2c. In case the second rubber layer 4 is provided over the sides walls 2c and the bead portions 2d, it is desirable that the thickness of the layer 4 is relatively thin at the positions not to spoil the cushioning of the tire.

The material to be used for the reinforcing second rubber layer 4 is not critical and may be widely selected from the classes of materials usually employed for tires. It is sufficient to employ substantially the same material as of the first rubber layer 2 with respect to rigidity and elasticity.

The tire of the present invention may be prepared by forming the reinforcing rubber layer 4 integrally with the body of tire in the tire manufacturing process or separately making a rubber layer section shaped according to the inner shape of tire and fixedly attaching it to a conventional tire by means of a suitable adhesive.

Figure 3:
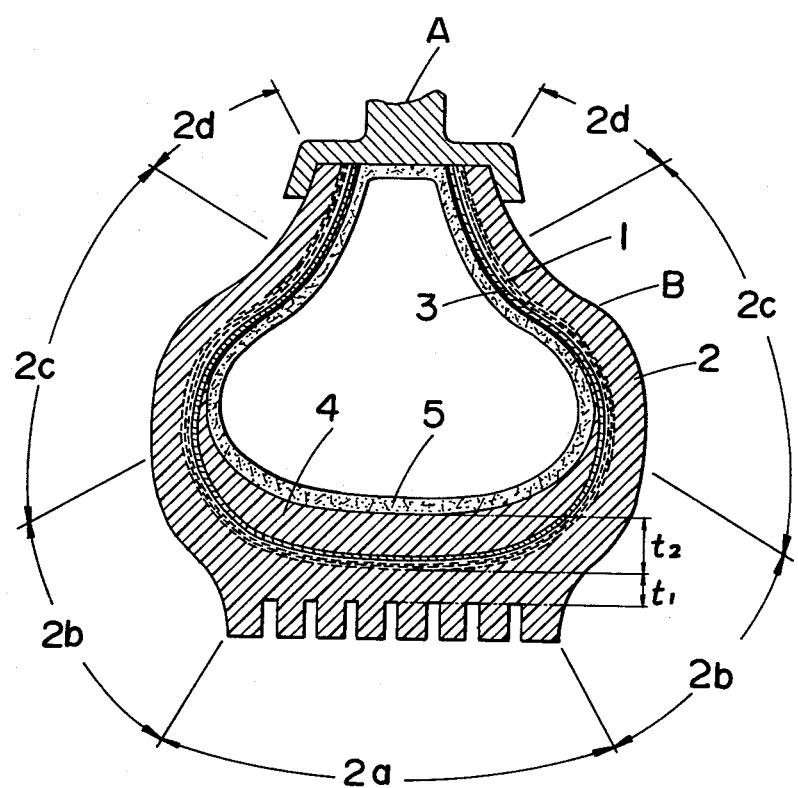
FIG. 3 is a cross-section of another form of a puncture-proof tubeless tire according to the present invention.

In another embodiment of the present invention as shown in FIG. 3, the second rubber layer 4 is provided inside the cord layer 1 in the same manner as of the foregoing embodiment and a specific lining agent 5 is contained in the interior of the tire. The lining agent 5 comprises a mixture of an adhesive and diethylene glycol and rubber particles dispersed therein. In this embodiment, the liner 3 may be omitted because this lining agent forms an air-tight film on the inner surface of the tire as mentioned in detail below.

The specific lining agent employed in the instant embodiment can be readily produced by dispersing rubber particles in a mixture of an adhesive aqueous emulsion and diethylene glycol. This lining agent has advantages that it is not dangerous at high temperatures and has no chemical eroding effect on rubber, the material of the tire. It is even more important for the lining agent to be able to avoid rapid solidification of the adhesive for keeping the lining agent fluid in the tire.

The adhesive to be employed in the lining agent may be any of the adhesives which are adhesive to rubber and capable of forming a uniform mixture with diethylene glycol. Typical examples thereof are adhesives mainly consisting of aqueous emulsions of polyvinyl acetate, a polyacrylic acid ester such as polymethyl acrylate, butadiene-acrylonitrile rubber, polychloroprene, a copolymer of chloroprene or the like. Adhesive emulsions of this type are commercially available under various trade names. For example, polyvinyl acetate emulsion type adhesives are available under trade names of TOABOND NO. 2,100, NO. 6,100, NO. 40H, NO. 71, etc. The composition of such series of TOABOND adhesives somewhat varies, but consists essentially of polyvinyl acetate, water and small amounts of additives including a surface active agent, a protective colloid and the like. TOABOND NO. 2,100 consists of 52.0 percent of water, 37.5 percent of polyvinyl acetate (p.v.a.), 0.5 percent of polyoxyethylene sorbitan monolauric acid ester (p.s.l.) as a surface active agent, 5.0 percent of polyvinyl alcohol as a protective colloid and 5.0 percent of other additives (percent is shown by weight). TOABOND NO. 6,100 consists of 58.0 percent of water, 31.5 percent of p.v.a., 0.5 percent of p.s.l., 5.0 percent of polyvinyl alcohol and 5.0 percent of other additives. TOABOND NO. 40H consists of 50.0 percent of water, 29.0 percent of p.v.a., 13.0 percent of polymethylacrylate, 1.0 percent of p.s.l., 5.0 percent of polyvinyl alcohol, 2.0 percent of other additives. TOABOND NO. 71 consists of 40.0 percent of water, 49.5 percent of p.v.a., 0.5 percent of p.s.l., 5.0 percent of polyvinyl alcohol and 5.0 percent of other additives. The mixture of an adhesive and diethylene glycol for use in the invention should be prepared in view of not only adhesiveness and fluidity but also effects intended with the use of diethylene glycol. Generally, 20 – 60 percent by weight, based on the amount of the adhesive, of diethylene glycol is preferably employed.

The rubber particles to be dispersed in the adhesive carrier may be made of any rubber material; for example, pulverized waste tire rubber. The rubber particles have a particle size of from 50 to 1,200 microns and are suitably present in an amount of from 5 to 20 percent, preferably from 7 to 18 percent by weight of the adhesive.

In case the adhesive aqueous emulsion employed is acid, for example polyvinyl acetate, a suitable neutralizing agent such as calcium carbonate may be employed in a necessary amount for example 0.05 to 0.15 percent by weight based on the adhesive, TOABOND NO. 40H advantageously to prevent corrosion of a rim of a wheel A.

The thus-obtained fluid lining agent is required to keep fluidity. The viscosity thereof is not critical but it generally has a viscosity of preferably 200 – 1,400 cps at a temperature of 21° C., to yield desired fluidity as well as wheel balance.

Further though the lining agent of the invention fully resists high temperatures up to about 250° C., the amount of the diethylene glycol may be suitably selected to surprisingly prevent freezing of the composition under cold conditions down to about −45° C. Further, unexpectedly this lining agent is excellent in heat absorption effect so that it can effectively absorb heat generated inside the tire for example during long running under hot conditions thereby to prevent deterioration of the tire caused by the heat.

The amount of the lining agent to be employed is not critical but it generally depends on the size of the tire to which this agent is applied. Stated illustratively, 500 g. to 1,000 g. of the lining agent may be advantageously employed for tires now available.

Referring now to FIG. 3, the operation for applying the lining agent of this invention to a tire is explained. The lining agent is introduced into the interior of the tire B fitted on the rim A. Subsequently, the tire B is inflated to a suitable pneumatic pressure and the wheel is gently rotated to thereby spread the fluid lining agent over the inner surface of the tire. As a result, not only the inner surface of the tire but a contact portion of the tire with the rim A is entirely covered with an airtight layer or film 5 composed of a mixture of an adhesive and diethylene glycol and rubber particles.

Following the above-described handling, a portion of liquid components contained in the lining agent evaporates to form a thin solid film 5. The evaporation stops in a moment since the interior of the tube becomes saturated and the other portion of liquid components remains in the lining agent to keep the agent almost permanently fluid in the tire.

In operation, when the reinforcing second rubber layer 4 or other part of the tire B is punctured, e.g., by picking up a nail, rubber particles dispersed in mixture of adhesive and diethylene glycol (kept fluid) will immediately enter the hole under the influence of the pressure in the tire as well as by the action of centrifugal force and, at the same time, be firmly attached thereto by the bonding action of the adhesive agent of the mixture which is exposed to the air and solidified thereby to completely seal the hole. Thus, the tire maintains its air-tightness, ensuring avoidance of puncture trouble. In this connection, it is to be noted that the use of rubber particles in the lining agent of the present invention contributes to the effectiveness of the present agent in not only sealing the hole, but maintaining the elasticity of the tire.

It should be noted that the lining agent employed in the instant embodiment of this invention may of course be used as an auxiliary puncture resisting agent for a conventional tire to enable puncture troubles to be completely eliminated.

As described, the present invention has made it possible for the first time in the field to render a tubeless tire perfectly resistant to puncturing and thus it makes a great contribution from an industrial point of view.

The present invention will now be illustrated in detail by reference to the following Examples that by no means limit the scope of the present invention.

EXAMPLE 1

In order to demonstrate the effect of the tire with the reinforcing rubber layer of the present invention, it was attached to an automobile, through the running of which the puncture-preventing property as well as the durability were examined. The results are summarized in the following table.

Table

| | | |
|---|---|---|
| Automobile | Name: Toyota Crown, 2,600 cc. Type: 74' type MS 80 Fuel: Gasoline | |
| Tire | Size | 175 SR 14 |
| | Thickness of outer rubber layer in crown portion excluding patterned projection | 7 mm. |
| | Thickness of reinforcing rubber layer provided at a region corresponding to crown and shoulders | 5 mm. |
| | Material of reinforcing rubber layer | same material as of outer rubber layer |
| Testing term | From April 3, 1975 to October 15, 1975 (for 195 days | |
| Total running distance | 43,637 km. | |
| Puncture and other accidents | Nothing | |

The tire used in this Example was made of SBR by Miyazato Sogo Kagaku Kenkyusho, Kawasaki, Japan. The reinforcing rubber layer was formed integrally with the other rubber layer.

EXAMPLE 2

800 g. of the lining agent prepared from the following ingredients was introduced into the interior of a tire having an outer rubber layer of 5 mm. in thickness in a crown excluding patterned prejections and having a reinforcing rubber layer of 5 mm. in thickness. A nail of 150 mm. in length and 8 mm. in diameter and a nail of 87 mm. in length and 4 mm. in diameter were thrust into the tire by 100 mm. and 85 mm., respectively and withdrawn therefrom after one day. Respective holes were sealed up the instant the respective nails were withdrawn and no leakage of air was observed thereafter.

| | | |
|---|---|---|
| 1. | TOABOND NO. 40H (The trade name of a transparent polyvinyl acetate adhesive aqueous emulsion having a p.v.a. concentration of 37.5 percent by weight, a viscosity of 13,000 cps at 20° C. manufactured by Toa Paint Co., Ltd.) | 100 parts by weight |
| 2. | diethylene glycol | 40 parts by weight |
| 3. | Rubber particles (pulverized waste tire rubber to have an average particle size of about 50 to 1,200 microns) | 8 parts by weight |
| 4. | Calcium carbonate | 0.1 part by weight |

The tire employed in this Example was prepared by the same method as in Example 1 except for the thickness of the outer rubber layer.

What is claimed is:

1. A puncture-proof tubeless tire which comprises:
    (a) an outer first rubber layer consisting of a crown having a tread with patterned portions, shoulders, side walls and bead portions;
    (b) a cord layer provided on the inner surface of the outer first rubber layer;

(c) a reinforcing second rubber layer provided on the inside of the cord layer at its region corresponding at least to the crown and the shoulders; and (d) a lining agent present in the interior of the tire, said lining agent comprising a mixture of an adhesive, 20 to 60 percent of diethylene glycol based on the weight of the adhesive and rubber particles dispersed in the mixture.

2. A puncture-proof tubeless tire as set forth in claim 1, wherein said reinforcing second rubber layer has, at the region corresponding to the crown and shoulders, a thickness in section of 0.4 to 4 multiple of the thickness in section of the outer first rubber layer present at the corresponding region excluding the thickness of the patterned projections.

3. A puncture-proof tubeless tire as set forth in claim 1, wherein said reinforcing second rubber layer is provided directly on the inside of the cord layer.

4. A puncture-proof tubeless tire as set forth in claim 1, wherein said reinforcing second rubber layer is provided indirectly on the inside of the cord layer.

5. A puncture-proof tubeless tire as set forth in claim 1, wherein said reinforcing second rubber layer is integral with the body of the tire.

6. A puncture-proof tubeless tire as set forth in claim 1, wherein said reinforcing second rubber layer is a section firmly attached to the body of the tire.

7. A puncture-proof tubeless tire as set forth in claim 1, wherein the rubber particles are present in an amount of 5 to 20 percent by weight based on the adhesive.

* * * * *